United States Patent [19]
Winkley

[11] 4,059,678
[45] Nov. 22, 1977

[54] STABILIZATION OF IRON-CONTAINING ACIDIC HYDROGEN PEROXIDE SOLUTIONS

[75] Inventor: Donald Charles Winkley, Trenton, N.J.

[73] Assignee: FMC Corporation, Philadelphia, Pa.

[21] Appl. No.: 328,987

[22] Filed: Feb. 2, 1973

[51] Int. Cl.² .................................................. C01B 15/2
[52] U.S. Cl. ...................................... 423/273; 252/86; 252/95; 252/142; 252/148; 260/502.5
[58] Field of Search ............... 252/142, 148, 95, 86; 260/502.5; 423/272, 273

[56] References Cited
U.S. PATENT DOCUMENTS

| | | |
|---|---|---|
| 2,961,311 | 11/1960 | Bersworth et al. ............... 260/502.5 |
| 3,234,124 | 2/1966 | Irani ................................. 260/502.5 |
| 3,383,174 | 5/1968 | Carnine ............................ 423/273 |
| 3,387,939 | 6/1968 | Reilly et al. ..................... 423/273 |
| 3,681,022 | 8/1972 | Kibbel ............................. 423/273 |

*Primary Examiner*—Brooks H. Hunt
*Attorney, Agent, or Firm*—Milton Zucker; Frank Ianno

[57] ABSTRACT

Aqueous, highly acidic solutions of hydrogen peroxide (pH under 2.0) containing iron contamination at the level of 30 to 30,000 ppm, are stabilized against undesired hydrogen peroxide decomposition by the dissolution therein of amino(methyl phosphonic acid)s or their soluble salts. Additional stabilizers are desirably used when other metallic contaminants are present.

7 Claims, No Drawings

STABILIZATION OF IRON-CONTAINING ACIDIC HYDROGEN PEROXIDE SOLUTIONS

This invention is concerned with the use of hydrogen peroxide in the acid treatment of metals —e.g., pickling — and primarily with the stabilization of the peroxide in such solutions where iron contamination is present.

Hydrogen peroxide is a large tonnage chemical widely used as a source of active oxygen. In pure form, its aqueous solutions are stable over extended periods of time. However, the presence of heavy metals in the solutions causes more or less rapid decomposition of the peroxide, and as a result, stabilizers are used to prevent such decomposition.

Most work on stabilization in the presence of heavy metal ions has been concerned with the storage stability of peroxide shipped in concentrated form, and diluted in the field, often with dilution water containing such heavy metals. Long range stability has been sought (1% loss per year at 15° C — under 5% loss in 24 hours at 100° C). Typical examples are U.S. Pat. No. 2,624,655 (1953) which uses pyridine carboxylic acids, U.S. Pat. No. 3,053,634 (1959) which uses ethylene diamine tetraacetic acid, U.S. Pat. No. 2,599,807 (1950) which uses tetra-substituted methylene phosphonic ethylene diamine, U.S. Pat. No. 3,122,417 (1964) and U.S. Pat. No. 3,214,454 (1965) which use acylation products of phosphonic acid, U.S. Pat. No. 3,234,140 (1966) whIch uses amino tri(methyl phosphonates), U.S. Pat. No. 3,383,174 (1968) which uses nitrilo trimethylene phosphonic acid along with stannates and U.S. Pat. No. 3,701,825 (1972) which uses ethylene tetra(methylene phosphonic acid). These additives seem to act by chelation of the relatively small amounts of contaminent (up to about 5 ppm) to render them inactive.

When hydrogen peroxide is used in the treatment of metals — for example, in non-ferrous metal pickling baths — a different sort of problem arises. These baths are typically highly acid — pH under 2.0 and generally under 1.0 — and contain substantial levels of heavy metals due both to the use of commercial grades of acid, and to the dissolution of metal in the treatment. Here, only short range protection against peroxide decomposition is sought, to prevent excessive loss during operation.

In copper pickling, for example, U.S. Pat. No. 3,537,895 (1967) uses certain organic acids (benzoic, glycolic, and propionic), and polyhydroxy alcohols (glycerol, ethylene glycol, and propylene glycol); U.S. Pat. No. 3,556,883 (1971) uses water soluble saturated aliphatic alcohols and U.S. Pat. No. 3,649,194 (1972) uses phenols and unsaturated organic alcohols. Work done with these and other stabilizers indicate that the presence of iron in the pickling baths, in amounts above about 30 parts per million (ppm), renders them ineffective. Since ordinary commercial sulfuric acid used for pickling often contains 300 ppm or more of iron to start with, and iron is picked up by pickling solutions from contact with iron parts, and accidental iron inclusion such as nails, bolts and nuts, these additives have been only partially effective in control of the problem.

A prior approach to the problem of iron contamination in acid pickling has been the use of fluoride ions (U.S. Pat. Nos. 2,086,123 (1935), 3,296,141 (1967), 3,369,914 (1968) and 3,537,926 (1970)). However, the use of fluorides in highly acid media is a rather tricky and hazardous business, and presents some rather undesirable corrosion problems. Hence, the industry has not been satisfied with this approach.

I have discovered that the stability of hydrogen peroxide in highly acid (pH under 2) aqueous solutions of strong acids other than halo-acids, which contain from 30 to 30,000 ppm of iron, can be markedly improved by dissolving in the solution amino(methyl phosphonic acid) either as the free acid, or as a soluble salt, using at least 3 phosphonic acid groups for each ferric ion in the solution. Surprisingly, these phosphonic acids, which have been recognized as chelating agents which solubilize the iron, do just the reverse under the highly acid conditions present, and precipitate the iron from solution; this precipitate was found to have no effect on hydrogen peroxide stability.

When the acid solution is to be used for the pickling of non-ferrous metals which catalyze the decomposition of hydrogen peroxide, it is desirable to control decomposition by the non-ferrous metal dissolved with one of the known control agents for that purpose, since the amino(methyl phosphonic acid) is not effective.

This invention, as noted above, is concerned with the stabilization of highly acid aqueous solutions of hydrogen peroxide, at pH below about 2.0, which are widely used for the cleaning and pickling of metal, and which normally contain moderate amounts of iron (30 to 30,000 ppm ferric ion). This iron strongly catalyzes the decomposition of hydrogen peroxide.

In working with this problem, I attempted to chelate the iron to render it inactive, but found chelative agents ineffective. However I found, to my surprise, that amino(methyl phosphonic acid)s, or their soluble salts, which were soluble in the strongly acid hydrogen peroxide solutions, precipitated ferric iron from these solutions, rather than chelating the iron; if 3 phosphonic acid groups were used for each ferric ion, the bulk of the iron was precipitated, and the remainder in solution was much less active in catalyzing the peroxide decomposition. I have no explanation for the phenomenon; but the addition does control the decomposition of the peroxide under these conditions.

The precipitate does not catalyze hydrogen peroxide decomposition, in contrast to precipitates of ferric hydroxide, which are active decomposition catalysts.

The amino(methyl phosphonic acid)s may be used as such, or in the forms of their soluble salts; — the alkali metal, ammonium, substituted ammonium, magnesium and calcium salts are generally as soluble, or more soluble, than the phosphonic acids themselves.

The simplest compound I have found effective is amino tri(methyl phosphonic acid)

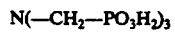

It is readily soluble in sulfuric acid, as are its sodium, potassium and ammonium salts. The replacement of one or two of the methyl phosphonic acid groups by organic radicals renders the material and its salts less soluble, but the substituted compounds are useful so long as they remain soluble. Ethylamino bis(methyl phosphonic acid) and its salts are soluble; the sodium salt of dodecylamino bis(methyl phosphonic acid) is water-soluble and a solution is readily prepared, but largely precipitates when added to sulfuric acid solutions; however, enough remains in solution to be effective in controlling relatively small amounts of iron. In general, the total number of carbons in the substitutents on the nitrogen should not exceed about 12 if solubility is to be maintained.

The amino(methyl phosphonic acid) used can be more complex — for example, I have used various polymethylene tetra(methyl phosphonic acid)s and their salts, of the generic formula

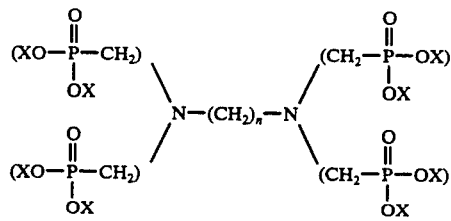

where $n=2$ to 6 and where X groups are hydrogen, ammonium, substituted ammonium, alkali metal, magnesium or calcium.

With the less soluble amino(methyl phosphonic acid)s, it is generally desirable to first make the salt solution by dissolving the acid in a base, and add this solution to the strong mineral acid solution of hydrogen peroxide. This is because the less soluble phosphonic acids tend to dissolve much more slowly than their salts.

Other amino (methyl phosphonic acid)s can be used, so long as they are sufficiently soluble in the strongly acid peroxide solution to give enough phosphonic acid to precipitate the iron. At least three phosphonic acid groups are needed for each ferric ion, on a molar basis.

The amount of iron in the solutions varies with conditions. Amounts of iron under 10 ppm have little effect on the short range stability, which I am interested in controlling; although, over a long period, such small amounts do cause decomposition. Normal ranges of dissolved ferric iron encountered in most commercial operations is 30 ppm to 3,000 ppm. However, amounts of iron up to 30,000 ppm (3%) can be controlled with the more soluble amino(methyl phosphonic acid)s.

The additives of this invention have been tested with sulfuric, phosphonic and nitric acid concentrations from 0.1 volume percent to highly concentrated solutions, and have been found useful at all concentrations, although decomposition becomes progressively more rapid at very high acid concentrations. In commercial operations, however, acid concentrations of above 25% are seldom used, and at these concentrations, the additives are highly effective. The additional presence of organic acids such as citric acid, gluconic acid and oxalic acid (all of which are sometimes used in pickling) do not interfere with the stabilizing action, nor do the alkali metal, alkaline earth metal and magnesium ions.

However, the presence of halides in concentrations of over 1% interferes with the stabilizing action. Hence, halides such as chlorides, fluorides, bromides and iodides should be avoided.

When the organo-phosphonic acids of the current invention were added to the acidic hydrogen peroxide solutions containing both copper and iron, it was found that peroxide decomposition proceeded very rapidly. Analysis of the solutions for iron showed that iron was still almost quantitatively precipitated from acid solutions; copper in no way appeared to interfere with the action of the organic phosphonic acids. The observed peroxide instability was concluded to be the decomposition of peroxide catalyzed by copper.

It was then discovered that the current invention could be combined with prior art stabilizers for hydrogen peroxide in the presence of copper, thereby providing a highly effective system for stabilization of hydrogen peroxide in acidic metal ion solutions containing both iron and copper. This combined stabilizer system was then found to be beneficial for acidic peroxide solutions containing mainly iron as the contaminant, giving somewhat better stabilities than the amino(methyl phosphonic acid)s alone.

Acid hydrogen peroxide solutions containing both copper and iron were effectively stabilized by the presence of the phosphonic acids of the current invention and stabilizers chosen from the class disclosed by Glanville in U.S. Pat. No. 3,649,194. Such stabilizers were phenol, paramethoxy phenol, allyl alcohol, crotyl alcohol and cis-1,4-but-2-enediol.

Similarly effective was a combination of the phosphonic acids of the current invention and stabilizers of Banush in U.S. Pat. No. 3,407,141. These stabilizers were sulfathioazole, phenacetin, phenylurea, diphenylurea, benzoic acid and hydroxybenzoic acid.

Combination of the present teachings with the teachings of Naito in U.S. Pat. No. 3,556,883 was similarly effective in stabilizing hydrogen peroxide solutions containing both iron and copper. Preferred stabilizers of Naito were water soluble aliphatic alcohols such as methanol, ethanol, propanol, butanol and mixtures thereof.

Lastly, combinations of organic phosphonic acids with stabilizers of Lancy in U.S. Pat. No. 3,537,895 were similarly effective in stabilizing hydrogen peroxide in acidic solutions containing both iron and copper. In this case claimed stabilizers for copper were benzoic acid, glycolic and propionic acids, glycerine, ethylene glycol and propylene glycol.

For the current invention the preferred auxiliary stabilizers selected from the prior art and others studied were the following: phenol; mono-, di-, and tri-methyl substituted phenols; lower molecular weight alkyl substituted phenols; mono-chloro, -fluoro and -bromo substituted phenols; anisole; benzoic acid and hydroxy-benzoic acids; allyl alcohol; phenacetin; sulfathiazole; phenyl urea and hydroxy substituted phenyl ureas; ethanol; propanol; butanol; ethylene glycol and propane diol.

The phosphonic acids of the current invention when combined with the auxiliary stabilizer were also effective in stabilizing acidic solutions of hydrogen peroxide from decomposition caused by the presence of a wide range of metal ions in addition to iron and copper. The presence of chromium, cobalt, nickel, silver, zinc, manganese, molybdenum, calcium, mercury or lead did not substantially increase the decomposition of hydrogen peroxide in acidic solutions containing the combined stabilizer system. Only one metal was found to adversely effect the hydrogen peroxide stability, that being vanadium at 200 ppm or above.

Thus, acidic solutions of hydrogen peroxide containing iron., copper and metal ions other than vanadium can be stabilized by a combination of the organo phosphonic acids of the current invention combined with organic stabilizers for acidic copper containing peroxide solutions of the prior art.

The following specific examples are given by way of illustration of the invention, and should not be deemed limiting thereof.

EXAMPLE 1

This example shows that the various phosphonic acids will stabilize hydrogen peroxide in acidic solutions containing iron.

An aqueous test solution was made containing 10 volume percent $H_2SO_4$, 20 g/l $H_2O_2$ and 100 ppm iron (added as a ferric sulfate solution); the solution was stored at 130° F.

| Organic phosphonic acid added | % $H_2O_2$ remaining after | |
|---|---|---|
| | 22 hours | 44 hours |
| none (for comparison) | 50 | 34 |
| 5 g/l amino-tri-(methylphosphonic acid) | 86 | — |
| 3 g/l Ethylenediamine tetra-(methyl phosphonic acid) | 91 | 82 |
| 10 g/l Hexenediamine tetra(methyl phosphonic acid) | — | 93 |
| 10 g/l Dodecyl-amino bis(methyl phosphonic acid) | — | 78 |

The amino(trimethyl phosphonic acid) was added directly to the sulfuric acid solution. The ethylenediamine tetra(methyl phosphonic acid), hexenediamine tetra(methyl phosphonic acid) and the dodecylamino bis(methyl phosphonic acid) were all predissolved in a minimum amount of 10% NaOH prior to addition to the sulfuric acid. The organo phosphonic acid or a solution of its salt was added to the sulfuric acid followed by addition of the hydrogen peroxide and finally a concentrated solution of ferric sulfate. A clear solution of the phosphonic acid in the sulfuric acid resulted in all cases except for the 10 g/l solution of dodecylamino bis(-methyl phosphonic acid) where at least partial precipitation of the compound occurred upon addition the sulfuric acid. However, when the iron solution was added a white flocculent precipitate formed almost immediately in all cases where organo phosphonic acid was added.

The presence of iron in this precipitate was confirmed by analysis of the solution after filtration. The initial solution makeup was the same as previous, containing 100 ppm iron. Analysis by atomic absorption spectrometry showed an iron content of 130 ppm, so that the iron content as reported is higher than actual in all cases where it appears in this and the other examples.

| organo phosphonic acid added | iron remaining in solution after filtration |
|---|---|
| 5 g/l amino-tri-(methylphosphonic acid) | 9.7 ppm |
| 3 g/l Ethylenediamine tetra-(methyl phosphonic acid) | 28.3 ppm |
| 10 g/l Hexenediamine tetra-(methyl phosphonic acid) | 4.4 ppm |
| 10 g/l Dodecylamino bis-(methyl phosphonic acid) | 4.5 ppm |

This white precipitate does not affect the stability of hydrogen peroxide, unlke ferric hydroxide precipitates. Hence, it need not be removed.

EXAMPLE 2

This example shows the synergistic effect of the organo phosphonic acids with phenol (a prior art stabilizer) when used to stabilize acidic iron containing solutions.

An aqueous test solution was made containing 10 volume percent $H_2SO_4$, 20 g/l $H_2O_2$ and 100 ppm iron (added as ferric sulfate); the solution was stored at 130° F.

| Phosphonic acid added[1] | No phenol added | | 100 ppm phenol added | |
|---|---|---|---|---|
| | % $H_2O_2$ remaining after | | % $H_2O_2$ remaining after | |
| | 22 hrs | 44 hrs | 22 hrs | 44 hrs |
| none | 50 | 34 | 92 | 57 |
| 5 g/l amino-tri-(methylphosphonic acid) | 86 | — | 98 | 87 |
| 3 g/l Ethylenediamine tetra(methyl phosphonic acid) | 91 | 82 | 96 | 95 |
| 10 g/l Hexenediamine tetra(methyl phosphonic acid) | — | 93 | 97 | 96 |
| 10 g/l Dodecylamino bis-(methyl phosphonic acid) | — | 78 | — | 97 |

[1]The phosphonic acids were added as in Example 1

Phenol is a reasonably good stabilizer for a very short time; however, it loses its effectiveness between 22 and 44 hours at 130° F. The phosphonic acids are very good stabilizers alone, but are further improved by the presence of the phenol.

EXAMPLE 3

This example demonstrates that a minimum of 3 moles of organo phosphonic acid groups are necessary per mole of ferric ion. The synergistic effect of phenol on the peroxide stability is also demonstrated. Iron levels from 30 to 1,000 ppm were investigated.

Peroxide stability was measured as percent $H_2O_2$ remaining after the given time period at 130° F.

An aqueous test solution was made containing 10 volume percent $H_2SO_4$, 20 g/l $H_2O_2$ and various amounts of iron (added as ferric sulfate).

Example 3

| A. Phosphonic Acid: 5 g/l amino-tri-(methylphosphonic acid) | | | | | | | |
|---|---|---|---|---|---|---|---|
| m/l $PO_3H_2$ groups | ppm Fe | m/l Fe | Mole ratio of —$PO_3H_2$ groups to Fe | ppm Fe in solution | No phenol added % $H_2O_2$ remaining after 24 hours | 100 ppm phenol added % $H_2O_2$ remaining after 24 hours | 100 ppm phenol added % $H_2O_2$ remaining after 42 hours |

Example 3-continued

| $m/l\ PO_3H_2$ | ppm Fe | m/l Fe | Mole ratio of —$PO_3H_2$ groups to Fe | ppm Fe in solution | % $H_2O_2$ remaining after 24 hours | 100 ppm phenol added % $H_2O_2$ remaining after 24 hours | 100 ppm phenol added % $H_2O_2$ remaining after 42 hours |
|---|---|---|---|---|---|---|---|
| $5.02 \times 10^{-2}$ | 0 | 0 | — | .90 | 98.6 | — | — |
| $5.02 \times 10^{-2}$ | 30 | $.054 \times 10^{-2}$ | 93 | 6.5 | 89.2 | — | — |
| $5.02 \times 10^{-2}$ | 100 | $.18 \times 10^{-2}$ | 28 | 9.7 | 86.1 | 98 | 87 |
| $5.02 \times 10^{-2}$ | 300 | $.54 \times 10^{-2}$ | 9.3 | 12.6 | 87.3 | 87.1 | 87.1 |
| $5.02 \times 10^{-2}$ | 500 | $.90 \times 10^{-2}$ | 5.6 | 18.8 | 78.0 | 87.9 | 88.7 |
| $5.02 \times 10^{-2}$ | 700 | $1.26 \times 10^{-2}$ | 4.0 | 21.2 | 65.2 | 86.3 | 85.5 |
| $5.02 \times 10^{-2}$ | 1,000 | $1.8 \times 10^{-2}$ | 2.8 | 224 | 38.9 | 82.3 | 54.8 |

B. Organo Phosphonic Acid: 3 g/l Ethylenediamine tetra(methyl phosphonic acid)

| $m/l\ PO_3H_2$ groups | ppm Fe | m/l Fe | Mole ratio of —$PO_3H_2$ groups to Fe | ppm Fe in solution | 100 ppm phenol added % $H_2O_2$ remaining after 24 hours | 100 ppm phenol added % $H_2O_2$ remaining after 42 hours |
|---|---|---|---|---|---|---|
| $2.62 \times 10^{-2}$ | 100 | $.18 \times 10^{-2}$ | 14.6 | 28.3 | 96.8 | 95 |
| $2.62 \times 10^{-2}$ | 300 | $.54 \times 10^{-2}$ | 4.88 | 11.1 | 96.8 | — |
| $2.62 \times 10^{-2}$ | 400 | $.72 \times 10^{-2}$ | 3.64 | 19.5 | 87.9 | 87.1 |
| $2.62 \times 10^{-2}$ | 500 | $.90 \times 10^{-2}$ | 2.92 | 31.5 | 90.5 | — |
| $2.62 \times 10^{-2}$ | 700 | $1.26 \times 10^{-2}$ | 2.08 | 457 | 50.0 | 0 |
| $2.62 \times 10^{-2}$ | 1,000 | $1.8 \times 10^{-2}$ | 1.45 | 560 | 24.2 | — |

C. Organo Phosphonic Acid: 10 g/l Hexenediamine tetra(methyl phosphonic acid)

| $m/l\ PC_3H_2$ groups | ppm Fe | m/l Fe | Mole ratio of —$PO_3H_2$ groups to Fe | ppm Fe in solution | 100 ppm phenol added % $H_2O_2$ remaining after 24 hours | 100 ppm phenol added % $H_2O_2$ remaining after 42 hours |
|---|---|---|---|---|---|---|
| $8.08 \times 10^{-2}$ | 100 | $.18 \times 10^{-2}$ | 45 | 4.4 | 96.8 | 96 |
| $8.08 \times 10^{-2}$ | 300 | $.54 \times 10^{-2}$ | 15 | 4.0 | 88.7 | 88.7 |
| $8.08 \times 10^{-2}$ | 500 | $.90 \times 10^{-2}$ | 9 | 3.5 | 86.3 | 88.7 |
| $8.08 \times 10^{-2}$ | 1,000 | $1.8 \times 10^{-2}$ | 4.5 | 3.3 | 82.3 | — |

D. Organo Phosphonic Acid: 10 g/l Dodecylamino bis(methyl phosphonic acid)

| $m/l\ PO_3H_2$ groups | ppm Fe | m/l Fe | Mole ratio of —$PO_3H_2$ groups to Fe | ppm Fe in solution | No phenol added % $H_2O_2$ remaining after 44 hours | 100 ppm phenol added % $H_2O_2$ remaining after 44 hours |
|---|---|---|---|---|---|---|
| $5.36 \times 10^{-2}$ | 100 | $.18 \times 10^{-2}$ | 30 | 4.5 | 78 | 97 |

The organo phosphonic acids were added as in Example 1. The solutions after the stability tests were filtered and the iron remaining in solution was measured by atomic absorption spectrometry. Both the stability determinations and final iron assays indicate that for amino-tri-(methylphosphonic acid), ethylenediamine tetra(methyl phosphonic acid) and hexenediamine tetra(methyl phosphonic acid) a mole ratio of three —$PO_3H_2$ groups per mole of iron is necessary to provide the best peroxide stability.

A control experiment was run using 10 volume percent $H_2SO_4$, 20 g/l $H_2O_2$ and various levels of iron (added as ferric sulfate), with no added stabilizer.

| ppm Fe | % $H_2O_2$ remaining after 24 hours |
|---|---|
| 0 | 96 |
| 30 | 70 |
| 100 | 50 |
| 300 | 14 |

EXAMPLE 4

This example shows the effect of acid selection and concentration on the ability of the organo phosphonic acids to stabilize acidic peroxide solutions containing iron.

A. Choice of acid

An aqueous test solution was made containing acid as listed, 20 g/l $H_2O_2$, 5 g/l amino-tri-(methylphosphonic acid) and 300 ppm Fe (added as a solution of ferric sulfate); the solution was tested at 130° F.

| Acid | Concentration | % $H_2O_2$ remaining after 24 hrs at 130° F |
|---|---|---|
| $H_2SO_4$ | 180 g/l | 87.3 |
| $HNO_3$ | 100 g/l | 93.2 |
| $H_3PO_4$ | 145 g/l | 71.8 |
| HF | 59 g/l | 56.8 |
| $(NH_4)F \cdot HF$ | 40 g/l | 16.2 |
| HCl | 45 g/l | 0 |

The above results indicate that the organic phosphonic acids stabilize hydrogen peroxide against decomposition by iron in non-halogen containing inorganic acid solutions.

B. Effect of acid concentration

An aqueous test solution was made containing sulfuric acid concentration as listed, 5 g/l amino-tri-(methylphosphonic acid) and 300 ppm iron (added as a solution of ferric sulfate); the solution was tested for stability at 130° F.

| Sulfuric Acid Conc. | Final pH | % $H_2O_2$ remaining 24 hrs at 130° F | Fe remaining in solution after test |
|---|---|---|---|
| 30% | <0 | 57 | 36 ppm |
| 10% | 0.5 | 79 | 13.5 ppm |
| 1% | 1.05 | 83 | 3.4 ppm |
| 0.1%* | 1.65 | 89 | 1.9 ppm |
| 0.1%* | 1.8 | 79.3 | 1.6 ppm |
| 0.1%* | 2.3 | 61.2 | 2.4 ppm |
| 0.1%* | 2.6 | 57.8 | 1.3 ppm |
| 0.1%* | 5.1 | 31.0 | 2.2 ppm |
| 0.1%* | 5.7 | 24.1 | 11 ppm |

-continued

| Sulfuric Acid Conc. | Final pH | % $H_2O_2$ remaining after 24 hrs at 130° F | Fe remaining in solution after test |
|---|---|---|---|
| 0.1%* | 6.15 | 12.9 | 18 ppm |

*pH adjusted to value listed by addition of NaOH

These results show that relatively low (0.1%) to moderate (25%) sulfuric acid concentrations are preferred. Stability decreases for either very low or high acid concentrations.

EXAMPLE 5

An aqueous test solution was made containing 10 volume percent $H_2SO_4$, 20 g/l $H_2O_2$, 30 g/l cupric ion added as cupric sulfate, 5 g/l amino-tri-(methylphosphonic acid) and 300 ppm $Fe^{+3}$ (added as a solution of ferric sulfate). The solution was tested at 130° F for the time specified.

| Auxiliary Stabilizer | Concentration | % $H_2O_2$ remaining after 24 hrs at 130° F |
|---|---|---|
| no added stabilizer | — | 4.8 |
| phenol | 100 ppm | 95 |
| phenol | 1,000 ppm | 100 |
| ethylene glycol | 10,000 ppm | 86 |
| benzoic acid | 1,000 ppm | 87 |
| sodium sulfathiazole | 1,000 ppm | 73 |
| 2-hydroxybenzoic acid | 1,000 ppm | 90 |
| 3-hydroxybenzoic acid | 500 ppm | 82 |
| 4-hydroxybenzoic acid | 500 ppm | 88 |
| propionic acid | 1,000 ppm | 72 |
| phenacetin | 1,000 ppm | 84 |
| 3-hydroxyphenyl urea | 500 ppm | 89 |
| allyl alcohol | 1,000 ppm | 100 |
| ethanol | 5,000 ppm | 80.3 |
| anisole | 1,000 ppm | 100 |
| o-cresol | 1,300 ppm | 97.5 |
| o-chloro phenol | 100 ppm | 100 |
| 1,2 Propane diol | 1,000 ppm | 82.6 |
| Phenyl urea | 1,000 ppm | 91.6 |

Similarly effective were the various mono-, di- and tri-methyl substituted phenols as well as other lower alkyl substituted phenols. Also effective were the various chloro, fluoro and bromo phenols. The hydroxy-, nitro- or amino- substituted phenols were not effective.

For comparison some of the auxiliary stabilizers were run in the same test solution without the presence of the organic phosphonic acid.

An aqueous test solution was made containing 10 volume percent $H_2SO_4$, 20 g/l $H_2O_2$, 30 g/l cupric ion added as cupric sulfate) and 300 ppm ferric ion (added as a solution of ferric sulfate).

| Auxiliary Stabilizer | Concentration | % $H_2O_2$ remaining after 24 hrs at 130° F |
|---|---|---|
| phenol | 100 ppm | 0 |
| ethylene glycol | 10,000 ppm | 41 |

Other potential stabilizers were run without the presence of an organo phosphonic acid. The results fell within the range listed above — namely, only 0 to 41% of the peroxide remained after 24 hrs at 130° F.

EXAMPLE 6

Comparison of the organo phosphonic acid type stabilizers with prior art stabilizers for hydrogen peroxide in strong acid solutions containing iron.

An aqueous test solution was made up containing 10 volume percent $H_2SO_4$, 20 g/l $H_2O_2$ and 300 ppm $Fe^{+3}$ (added as ferric sulfate).

| Solution | Additive | % $H_2O_2$ remaining after 24 hrs at 130° F |
|---|---|---|
| 1* | 5 g/l amino-tri-(methylphosphonic acid) | 88 |
| A** | 10 g/l ammonium bifluoride | 8.8 |
| B** | 10 g/l ammonium bifluoride + 10 g/l oxalic acid | 23 |
| C** | 10 g/l ammonium bifluoride + 10 g/l glycolic acid | 22 |
| D** | 10 g/l ammonium bifluoride + 10 g/l urea | 21 |
| E** | 10 g/l ammonium bifluoride + 10 g/l glycolic acid + 1 g/l benzoic acid | 50 |
| F** | 10 g/l oxalic acid | 42 |

*the invention
**prior art

Stated another way, the organic phosphonic acid stabilizers of the current invention limited the hydrogen peroxide decomposition in the test solution to less than 15% in 24 hrs. at 130° F while the best of the prior art stabilizers resulted in 50% loss of the hydrogen peroxide.

EXAMPLE 7

This example demonstrates the utility of the current invention for stabilization of hydrogen peroxide used for pickling of copper rod.

Pickling Solution: 10 volume percent $H_2SO_4$, 200 ppm ferric ion (added as ferric sulfate), 0-80 g/l cupric ion (present as copper sulfate).

Stabilizer system: 0.65 to 1.6 g/l amino-tri-(methylphosphonic acid), 0.2 to 0.6 g/l ethylenediamine tetra(methyl phosphonic acid), 62 to 165 ppm phenol.

The pickling solution was used over a period of 4 days during which the copper concentration was increased from 0 g/l to 80 g/l by dissolving copper metal. Overnight (16 hrs) stabilities run at 120° F indicated that 94 to 97% of the peroxide remained undecomposed. The peroxide consumed dissolving pure copper foil at 120° F varied from 0.50 to 0.67 grams of $H_2O_2$ per gram of copper dissolved. These numbers are very close to the theoretical value of 0.54 g $H_2O_2$/g Cu.

Sample 5/16 inch copper rods as produced by heating, rolling and drawing copper wire bars were first pickled in 20 volume percent $H_2SO_4$ at 160° F for 30 min. After this prepickle there remained a loosely adherent red scale on the copper surface. The rods had a dull red appearance. These prepickled rods were pickled in the peroxide solution above 120° F for 40 sec. A weight loss of 0.60 grams per kilogram of rod pickled was observed in the peroxide pickle. The final rod had an attractive bright clean copper colored finish.

Obviously, the examples can be multiplied indefinitely, without departing from the scope of the invention as defined in the claims.

The term amino(methyl phosphonic acid) as used throughout the specification and claims, refers to compounds where an N is attached to one or more ($CH_2$—P—$O_3X$) groups. These are more generally referred to in the literature as amino(methylene phosphonic acid)s.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of using hydrogen peroxide in aqueous mineral acid compositions at a pH below 2.0, in which the acid is selected from the group consisting of sulfuric, nitric and phosphoric acids, and the composition is relatively free of halide, but contains dissolved ferric iron in amounts between 30 ppm and 30,000 ppm, the method of retarding the decomposition of the hydrogen peroxide induced by the iron which comprises precipitating almost all of the dissolved iron by contacting it with an amino(methyl phosphonic acid) in solution in the composition, using at least three phosphonic acid groups for each ferric iron ion present.

2. The method of claim 1, in which there is also present a stabilizer against decomposition by copper, whereby the composition can be used in the treatment of non-ferrous metals other than vanadium.

3. The method of claim 1, in which the amino(methyl phosphonic acid) is amino-tri-(methylphosphonic acid).

4. The method of claim 1, in which the amino(methyl phosphonic acid) is ethylenediamine tetra(methyl phosphonic acid).

5. The method of claim 1, in which the amino(methyl phosphonic acid) is hexenediamine tetra(methyl phosphonic acid).

6. The method of claim 1, in which the amino(methyl phosphonic acid) is dodecylamino bis(methyl phosphonic acid).

7. The method of claim 2, in which the stabilizer for copper is phenol.